United States Patent

[11] 3,603,063

| [72] | Inventors | Clark E. Stroburg;<br>Eldon L. Stroburg, both of, Blockton, Iowa 50836 |
|---|---|---|
| [21] | Appl. No. | 883,941 |
| [22] | Filed | Dec. 10, 1969 |
| [45] | Patented | Sept. 7, 1971<br>Continuation-in-part of application Ser. No. 796,749, Feb. 5, 1969. |

[54] COMBINE
14 Claims, 5 Drawing Figs.
[52] U.S. Cl.................................................... 56/14.6,
130/24, 130/27
[51] Int. Cl....................................................... A01d 41/12
[50] Field of Search............................................ 56/14.3,
14.4, 14.5, 14.6; 130/27 R, 27 A–27 H, 27 HA, 27
HF, 27 J, 27 JT, 27 K–27 N, 27 P, 27 Q, 27 S, 27 T,
27 AE, 27 W, 27 AF, 27 Y, 27 Z, 27 AA, 27 AB,
27 AC, 21, 22, 23, 24, 25, 26

[56] References Cited
UNITED STATES PATENTS

| 293,755 | 2/1884 | Lippy........................... | 130/26 |
| 577,608 | 2/1897 | Rogers ......................... | 130/24 |
| 3,092,116 | 6/1963 | Stroburg et al. ............... | 130/27 AE |
| 3,109,433 | 11/1963 | Claas............................ | 130/24 |
| 3,411,274 | 11/1968 | Jarvis ........................... | 56/14.6 |

*Primary Examiner*—Russell R. Kinsey
*Attorney*—Morton S. Adler

ABSTRACT: An airflow system for a combine harvester to more effectively float and carry away the straw and chaff and thus increase the efficiency of the separating and cleaning mechanism which includes conveying apparatus, straw walkers, a cleaning shoe mechanism comprising an adjustable chaffer and an adjustable sieve and a fan means for delivering an airflow up through the cleaning shoe mechanism all as is well known. This invention may be used with combines employing either a concave or a concave grate in relation to the threshing cylinder and includes means for utilizing the fan normally providing an undershot airflow to the cleaning shoe mechanism to also provide an overshot flow of air directed to pass intermediate the conveyor apparatus and the threshing cylinder in a rearward direction upwardly through and over the straw walkers and to float the chaff and straw out of the rear of the machine without preventing the heavier grain on the conveyor apparatus from reaching the cleaning shoe mechanism or the grain on the walker from falling either through the openings therein into the trough below or back onto the conveyor apparatus where it can move to the cleaning shoe mechanism. This invention also includes the mounting of a vertically adjustable air flow barrier between the underside of the straw walkers and the rearward end of the cleaning shoe mechanism so that a portion of the airflow will be deflected upwardly and somewhat forwardly relative to the cleaning shoe mechanism and then upwardly through the straw walkers and out of the rear of the machine.

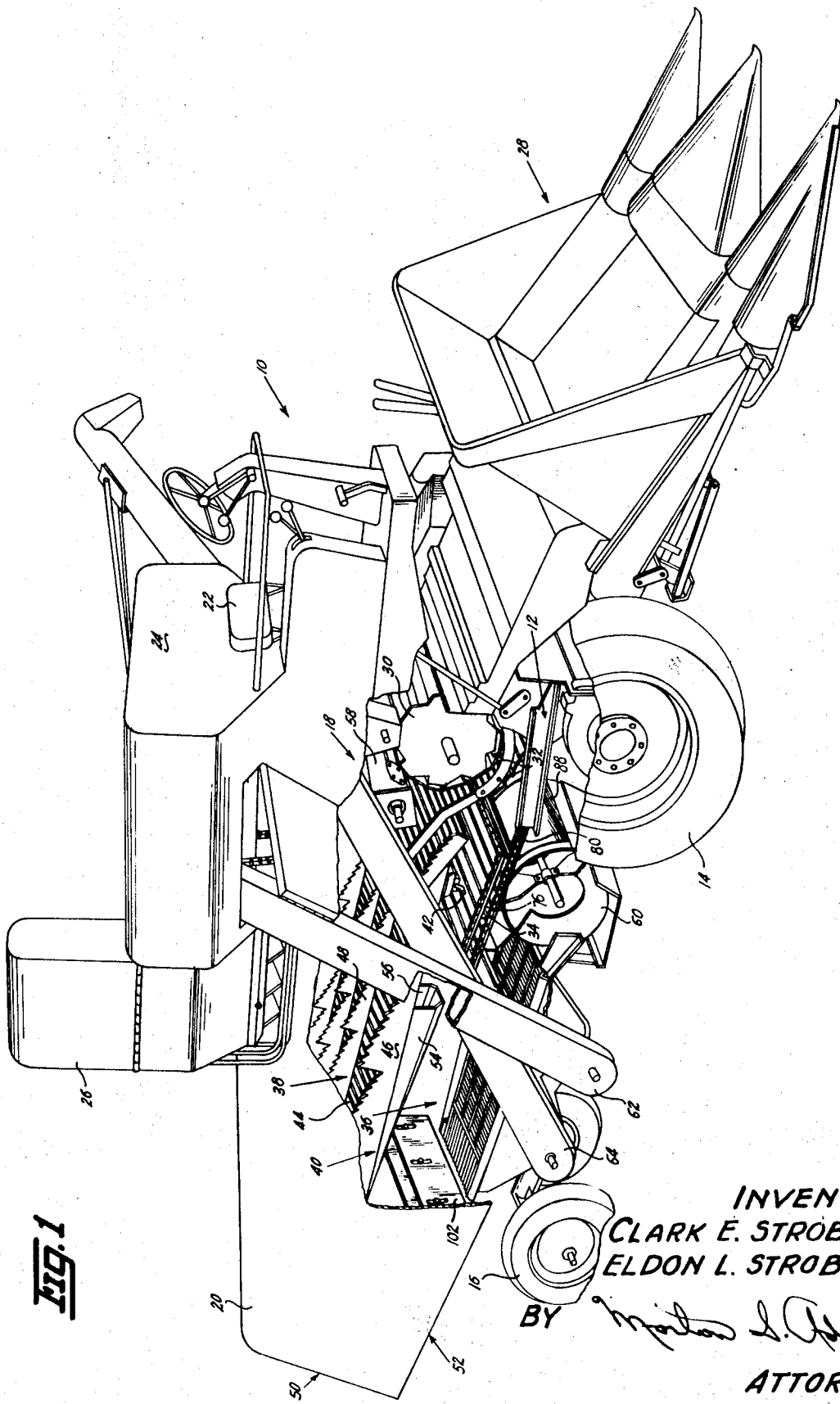

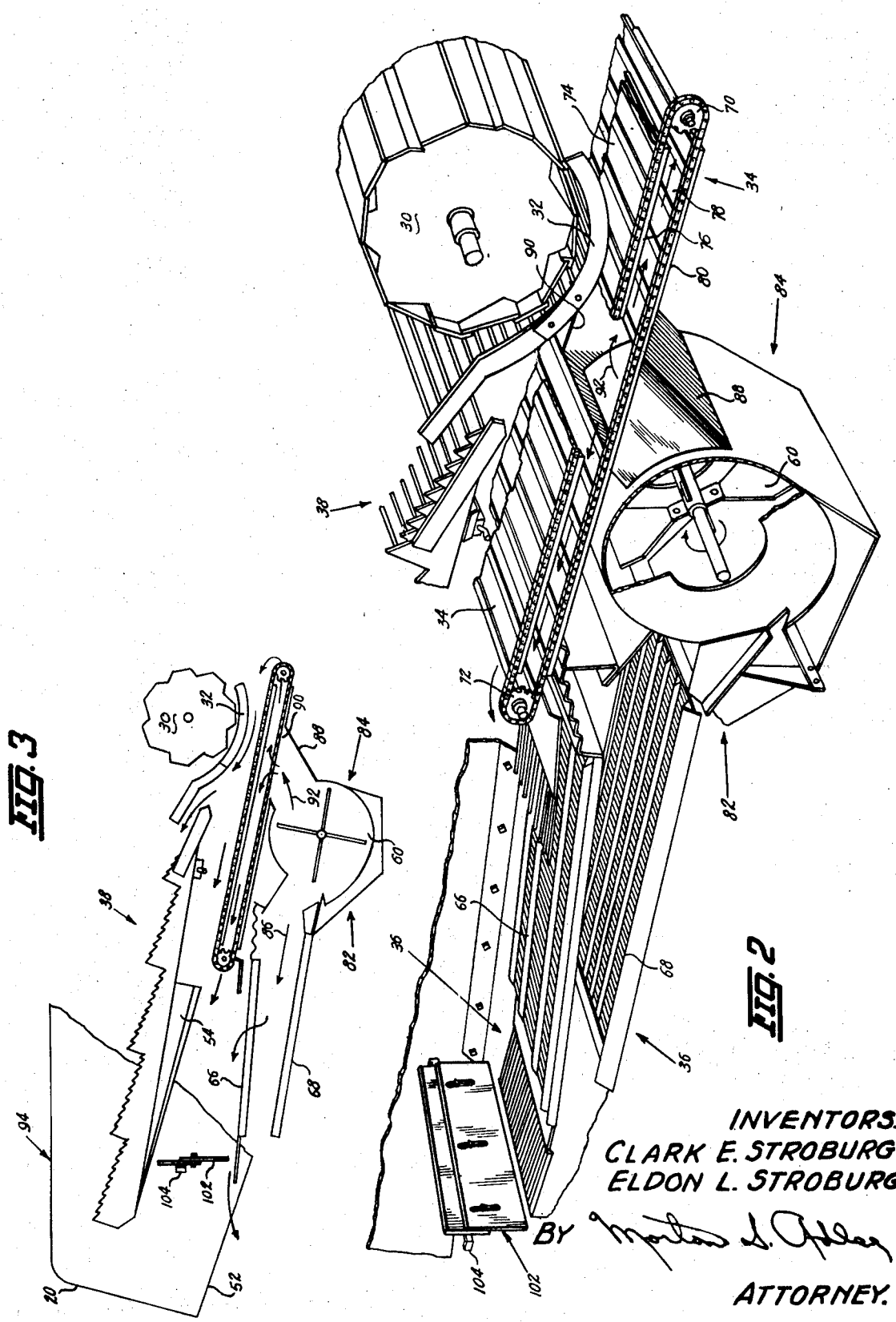

INVENTORS.
CLARK E. STROBURG
ELDON L. STROBURG

BY Morton S. Adler
ATTORNEY.

COMBINE

CROSS-REFERENCE TO RELATED APPLICATION

This invention is a continuation-in-part of our copending application under the same title, Ser. No. 796,749, filed Feb. 5, 1969.

BACKGROUND OF THE INVENTION

1. Field of the Invention

This invention relates to a two-directional airflow system from a single fan on a combine harvester to improve the efficiency of the separating mechanism in the separation of the straw and chaff from the grain.

2. Description of the Prior Art

Combines are old and well known and while they are available in various designs and models, they perform the basic functions of harvesting, threshing and cleaning the grain. One type of combine as exemplified in U.S. Pat. No. 2,937,647 moves the crop from a threshing cylinder onto a conveyor of the raddle-type having a bottom pan which prevents any material from falling therethrough so that said material can be delivered onto the straw walkers which comprise a series of oscillating elements as is well known in the art. Another well-known type of combine as shown in U.S. Pat. No. 857,147 utilizes a concave grate below the threshing cylinder whereby the bulk of the threshed material passes onto a raddle-type conveyor for direct delivery to the cleaning shoe mechanism and this is the type of combine which we have shown to illustrate the present invention although it will be understood that it is not limited thereto. It is also pointed out that conveying apparatus used with combines may include auger mechanisms and grain pans as well as raddle types and this invention can be effectively employed with all such arrangements.

The use of some form of a fan mechanism to create an airflow is illustrated in the two patents above referred to and is also disclosed in U.S. Pat. No. 293,755 so that an airflow means per se is well known in the art, being sometimes provided by a single fan means and at other times by multiple fan means as represented by the art referred to. However, so far as can be determined, whenever a single fan means has been used, it is in relation to the cleaning shoe mechanism and has been limited to that purpose and where other airflow means have been desired such as in relation to the walkers and conveying apparatus, separate fan means have been provided for that purpose.

The object of the separating and cleaning mechanism is to remove as much of the straw and chaff as possible from the grain but not infrequently, in the combine structures presently available, considerable amounts of chaff will be present which tends at times to form a heavy mat on the cleaning shoe mechanism and also to clog the straw walkers so that the efficiency of the separating and cleaning mechanism is seriously affected. It is thus one of the primary objects of the present invention to provide an airflow of pressurized area at the point of the initial separation of the grain and chaff at the threshing cylinder and thus to more effectively float the chaff and grain over a more effective area and time period so as to increase the efficiency of the separating and cleaning mechanism of the machine. A further object of this invention is to utilize the standard or conventional fan mechanism heretofore associated solely with the cleaning shoe mechanism and to adapt this single fan to provide not only the normal undershot airflow upwardly through the chaffer of the cleaning shoe mechanism but also to provide an overshot airflow to direct the air between the threshing cylinder and the conveyor apparatus rearwardly up through the straw walkers and out of the rear of the machine.

A further object of this invention is to provide an airflow barrier member at the rear of the cleaning shoe mechanism so that a portion of the undershot airflow from the fan means will be deflected upwardly through the straw walkers and out of the rear of the machine.

SUMMARY

The present invention is an improvement for a combine harvester and is illustrated on the type of such machine wherein the crop-gathering mechanism delivers the crop to a threshing cylinder beneath which there is mounted a concave grate. Such cylinder is of the type designed to effect the bulk of the separation of the threshed material which will fall through the grate onto a conveyor apparatus for delivery to a cleaning shoe mechanism. Material which does not fall through the grate is propelled by the threshing cylinder onto a separating mechanism known as the straw walkers which is a well-known apparatus in the art designed to move the straw rearwardly out of the machine and permit the heavier grain to sift through openings in the walkers to a trough below or to fall back onto the conveyor where it can move to the cleaning shoe mechanism comprised of an adjustable chaffer and an adjustable sieve in a well known manner. Tailings material is returned to the threshing cylinder. The combine, in its normal construction, includes a cleaning fan associated with the cleaning shoe mechanism for supplying a flow of air that moves upwardly through the shoe mechanism to float away the chaff and permit only the clean grain to reach an elevator for delivery to the storage tank. Such fans, depending upon their relative position for operation, are known as undershot or overshot fans and for the single fan mechanism which is generally standard for the cleaning shoe mechanism on combines, the undershot fan is preferable used.

The amount of chaff which frequently reaches the cleaning shoe mechanism will at times be quite substantial where it will tend to mat and clog the chaffer component and also a considerable amount of fine chaff will often sift with the grain through the straw walkers to add to the clogging and matting of the chaffer. To avoid the heavy accumulation of chaff on the cleaning mechanism both from the conveyor apparatus and from the straw walker, we have pressurized the area between the threshing cylinder and the conveyor apparatus in order to create an airflow which will effectively float the straw and chaff out of the machine before it reaches the cleaning shoe mechanism. This is accomplished by utilizing the standard undershot fan assembly normally associated only with the cleaning shoe mechanism. For this purpose we have provided an air takeoff duct at the forward side of the fan housing to catch the overshot airflow and this is delivered to a point between the threshing cylinder and conveyor in any suitable manner for which we have shown two forms. In the preferred arrangement an opening is provided in the lowermost pan of the conveyor assembly over which the raddle conveyor passes and the conduit from the fan assembly is secured to such lower pan in registration with said opening so that the overshot air from said fan is directed against the underside of the upper pan on the conveyor. This causes the air to move both forwardly and rearwardly relative to the conveyor as it seeks an escape route so that one portion moves forwardly around the forward end of the conveyor and then rearwardly between the grate and the top of the conveyor toward the straw walkers where it passes both over the straw walkers and up the trough beneath the straw walkers to float a portion of the chaff out of the rear of the machine. The other portion of the air directed against the upper plate of the conveyor will move rearwardly around the rear end of the conveyor and upwardly through the trough of the straw walker. Utilizing the overshot airflow from the traditional fan does not in any way interfere with or reduce the airflow capacity of the undershot flow directed toward the cleaning shoe mechanism. In a second arrangement, we run the overshot air conduit from the fan upwardly around the outside of the lower frame of the combine and secure the outlet end of such conduit through the housing of the combine at a point where the airflow will be effective as above referred to.

As a further means of providing increased airflow, we have placed a vertically adjustable air barrier member below the straw walkers and spaced somewhat above the rear of the cleaning shoe mechanism so that the undershot airflow from the conventional fan will in part be deflected upwardly and somewhat forwardly relative to the cleaning shoe mechanism to find its way upwardly through the trough of the straw walkers and out of the rear of the machine. Thus from the conventional one directional undershot fan, we have made it two directional to substantially increase its utility and provide a pressurized airflow which effectively increases the efficiency of the combine.

The objects of this invention together with details of the operation outlined and the advantages of the same will be more fully described and developed in relation to the more detailed description of the accompanying drawings.

BRIEF DESCRIPTION OF THE DRAWINGS

FIG. 1 is a perspective view, partially cut away, of one type of combine harvester machine and showing a preferred embodiment of this invention associated therewith, FIG. 2 is an enlarged fragmentary perspective view of portions of the threshing and cleaning apparatus and showing the preferred embodiment of our improved airflow system associated therewith, FIG. 3 is a reduced schematic side view of the structure in FIG. 2 to illustrate the paths of airflow provided by this invention.

DESCRIPTION OF THE PREFERRED EMBODIMENT

Figure 4:
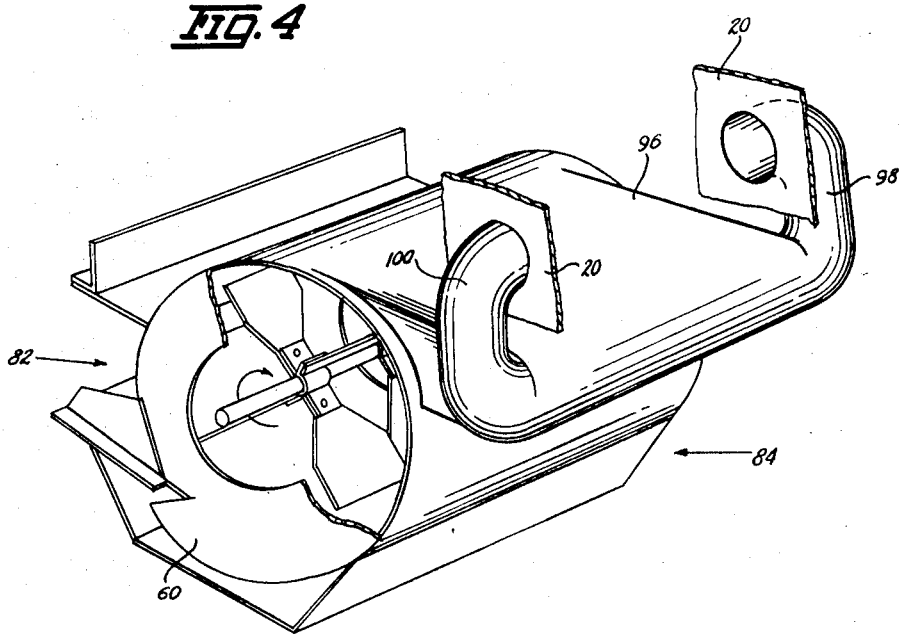
FIG. 4 is an enlarged perspective view of the cleaning fan on a combine harvester showing a second embodiment of our airflow system associated therewith.

Referring to the drawings, the combine machine on which this invention is illustrated is designated generally by the numeral 10 and while no invention is claimed in such machine per se, sufficient of the structure thereon has been shown and will be referred to for purposes of a better understanding of the improvement which we shall describe.

Combine 10 includes a suitable frame 12 to which there is mounted the forward driving wheels 14 and the rear wheels 16. Carried by frame 12 intermediate the front and rear wheels is a variety of equipment which will be separately referred to but which can be generally designated as the separating mechanism 18 and which is enclosed by a suitable housing 20. Above the drive wheels is the operator's seat or station 22 from which a grain storage tank 24 extends rearwardly to the engine section 26. Extending forwardly of frame 12 below the operator's seat 22 is the crop-gathering apparatus 28 of a well-known structure.

Material gathered through the apparatus 28 is delivered to a rotatable threshing cylinder 30 which acts to separate the grain from the chaff and straw in such a manner that the bulk of such threshed material will fall downwardly through the concave grate 32 located just below cylinder 30. Such material falls onto a conveyor apparatus 34 for delivery to the cleaning shoe mechanism designated generally by the numeral 36 and this, of course, includes fine chaff able to pass therethrough. Material which is too large to pass through the grate 32 or does not pass therethrough is propelled by the cylinder 30 onto the separating apparatus which is known as the straw walkers 38. Such straw walkers are well known and together with the other machine structure referred to are suitably operatively connected to the engine 26 for operation as is generally well known and for which no invention is here claimed. Generally, the straw walkers 38 consist of three like sections for which a brief description and reference to one of such sections, designated by the numeral 40, will be sufficient for purposes of the present invention. Straw walkers 38 as represented by section 40 are operatively connected to a crank shaft 42 so that each section rapidly oscillates in such a manner as to move the straw and chaff rearwardly. Section 40 includes the foraminous rack 44 flanked by the respective sidewalls 46 and 48 which extend toward but not to the rearward closed end 50 of housing 20 that is open at the bottom 52 as is well known. The bottom of section 40 is enclosed by a sheet metal trough 54 which extends from the rear of housing 20 forwardly and downwardly so that the material moves through said trough to the discharge point 56 for delivery onto the cleaning shoe mechanism 36. In the operation of straw walkers 38, the lighter weight straw and larger chaff will be moved rearwardly and the heavier grain together with fine chaff will fall by gravity through the apertures in the like racks 44 into the troughs 54.

A beater element 58 is disposed rearwardly of cylinder 30 to act upon the material being delivered to the straw walkers in a well-known manner.

As a regular component of this combine, a fan member 60 located below conveyor 34 is used to direct air across the cleaning mechanism 36 to float away fine chaff that may reach this point so that the clean grain can fall into the elevator 62 for delivery to tank 24. Tailings in the cleaning mechanism 36 will fall into elevator 64 for delivery back to the threshing cylinder 30 as is well known. The cleaning shoe mechanism 36 includes the well known upper adjustable chaffer element 66 and the lower adjustable sieve element 68 (FIG. 2) so that the threshed material from conveyor 34 and trough 54 is first deposited on chaffer 66 where the major difficulty is encountered relative to matting and clogging.

The conveyor apparatus 34 illustrated herein and as best seen in FIG. 2 is of the endless raddle-type moving over the respective front 70 and rear 72 sprockets to define an upper crop moving level 74 moving from front to rear over an upper pan 76 and a lower return level 78 moving from rear to front over a lower pan 80. Such type of conveyor apparatus is well known and is shown only as an example to illustrate the use of this invention as will appear. It will be understood that other forms of conveyor apparatus such as screw or augers, grain pans and the like are used with combine harvesters and this invention may be employed in all such arrangements. It is further pointed out that while the machine shown here utilizes a concave grate 32, other types of combine may use only a concave and such differences do not interfere with the successful use of the invention to be described hereinafter.

The threshed material will contain a mixture of grain, straw, and chaff in various conditions of fineness and coarseness and the general purpose of the straw walkers 38 and the cleaning shoe mechanism 36 is to separate and remove all of the extraneous matter so as to recover the clean grain for delivery to tank 24. For this purpose, the great bulk of the material which passes directly to the cleaning mechanism 36 from conveyor 34 is subjected to a rearwardly directed undershot airflow from fan 60 over sieve 68 and upwardly through chaffer 66 whereby the chaff is intended to be floated away out of the rear of the machine and only the clean grain recovered. Likewise, the larger pieces of straw and chaff which reach the straw walkers 38 are intended to be moved rearwardly out of the machine so that the heavier grain will either sift through into troughs 54 or be agitated onto conveyor 34 for movement to the cleaning shoe mechanism 36. Thus, the cleaning mechanism 36 receives threshed material both from the trough 54 and from conveyor 34 for final cleaning. In this regard, the amount of fine chaff and extraneous matter which finds its way to chaffer 66 is often quite substantial so as to pile up and clog the same so that the efficiency of fan 60 is materially reduced when this situation develops and thus the efficiency in general of the separating process is adversely affected since much of the grain will not reach the elevator 62. In this environment, it is the primary purpose of this invention to provide an improved airflow or air pressurized system to effectively act against the chaff to prevent it from reaching the chaffer 66 and thus forming excessive and heavy accumulations thereon so that the overall cleaning mechanism can operate at its intended efficiency.

Accordingly, we have adapted the standard or conventional cleaning fan 60 that is normally unidirectional for producing an airflow relative to the cleaning shoe mechanism 36 to be two-directional and to also provide an airstream relative to the threshing cylinder 30 and the conveyor 34. For purposes of describing this arrangement, fan 60 is further identified as having a rear side 82 and a front side 84. In the standard arrangement of fan 60, the blades thereon rotate clockwise as viewed in FIG. 2 to provide an undershot airflow indicated by the arrows 86 in FIG. 3 which normally pass over the sieve 68 and upwardly through the chaffer 66 and eventually out of the rear of the housing 20 at the bottom portion 52. Normally, the front side of such fan is completely closed since, as indicated above, the sole purpose and function of fan 60 in its conventional arrangement is to provide the undershot airflow 86. For purpose of our invention, we have provided a suitable opening on the front side of fan 60 to which there has been secured the airflow conduit 88 as best seen in FIG. 2. This conduit is located so as to intercept the overshot airflow from fan 60 and direct it forwardly and upwardly as follows. An opening 90 is provided in the lower pan 80 of the conveyor apparatus 34 and one end of airflow conduit 88 is secured to pan 80 in registration with opening 90. By this arrangement, the overshot airflow from fan 60 indicated by the arrow 92 as best seen in FIG. 3 will move upwardly through conduit 88, through the opening 90 in the lower pan 80 and be deflected against the underside of the upper pan 76 where a portion of such flow will pass forwardly between pans 76 and 80 to the forward end of the conveyor. At this point, it will be understood that a barrier is provided by the forward part of housing 20 so that the path of least resistance results in the airflow passing rearwardly between the threshing cylinder 30 and the conveyor 34 so that such airflow moves upwardly through the straw walkers and out of the rear of the machine. The other portion of the airflow from conduit 88 which is deflected against the upper pan 76 will move rearwardly between pans 76 and 80 and find its way around the rearward end of the conveyor also up through the straw walkers and out of the rear of the machine. Experience has demonstrated that the utilization of the overshot airflow as indicated does not in any way reduce or diminish the undershot airflow and its efficiency.

The amount of airflow generated through the airflow conduit 88 is quite substantial and materially increases the efficiency of this combine harvester. Since the airflow from conduit 88 will eventually become comingled with the undershot airflow 86 in the rearward portion of the combine for discharge out of the lower end 52 thereof, it may be found desirable to somewhat elevate the roof portion 94 at the rearward end of housing 20 in order to provide suitable clearance for the passage of air and chaff that will accumulate in this area as a result of the increased efficiency of the two-directional airflow arrangement for fan 60.

Figure 5:
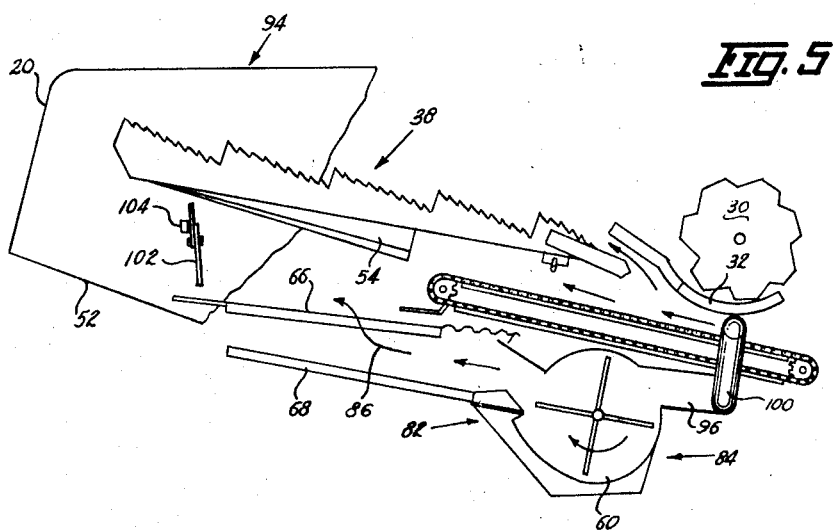
FIG. 5 is a fragmentary schematic side view of the threshing and cleaning apparatus showing the airflow system of FIG. 4 associated therewith.

With reference now to FIGS. 4 and 5, we show a second embodiment of the two-directional airflow arrangement for fan 60 as follows. An airflow duct 96 extends forwardly from the front side of fan 60 to intercept the overshot airflow in the same manner as for conduit 88. The forward end of conduit 96 is closed and at each side of such forward end there is provided the respective air conduits 98 and 100 which extend respectively in opposite directions outwardly from below the combine housing and then upwardly with the respective outlet ends of such conduits being secured through the sidewalls of the housing 20 as seen in FIG. 4. The point on housing 20 at which conduits 98 and 100 are attached are so positioned that the overshot air from fan 60 moving through such conduits will be discharged at opposite sides of the cylinder 30 so that such airstreams will impact between the cylinder and the conveyor 34 at which point they will move rearwardly and upwardly through the straw walkers 38 and out of the rear of the combine. The effect and purpose of the embodiment shown in FIG. 4 is the same as previously described for the disclosure in FIG. 2.

To further increase the efficiency of our improved airflow system for floating away the chaff before it can accumulate on the chaffer 66, we have provided a vertically disposed and vertically adjustable airflow barrier 102 between the straw walker assembly 38 and the rearward end of the cleaning shoe mechanism 36 as can be seen in FIG. 1. In the rearward portion of housing 20 there is present the brace member 104 (FIG. 2) extending between opposite sides of said housing and barrier 102 is attached to such brace 104 in any suitable manner so that the upper edge of said barrier will be just below the lower plane of movement of the straw walkers 38 as is well known. The bottom edge of such barrier as shown is vertically adjustable in a well-known manner so that the bottom edge thereof may be selectively arranged in spaced relationship to the chaffer 66. By this arrangement, the undershot airflow 86 from fan 60 which passes over the sieve 68 and up through the chaffer 66 will carry a substantial portion of the chaff below barrier 102 and out of the rear of the machine. However, a portion of such undershot airflow from fan 60 will be deflected by barrier 102 s0 that it will move upwardly and possibly somewhat forwardly relative to chaffer 66 and then upwardly through the straw walkers 38 and out of the rear of the machine. It will thus be appreciated that the use of barrier 102 utilizes at least a portion of the undershot airflow from fan 60 to carry away any chaff that may be sifting toward the chaffer 66 from the straw walkers 38 and such a purpose is not present in the standard arrangement of the undershot fan 60.

Accordingly, from all of the foregoing, it is thought a full understanding of the construction and operation of this invention will be had and the advantages of the same will be appreciated.

We claim:

1. In a combine harvesting machine of a type having a forwardly disposed crop-harvesting apparatus, a housing enclosing cleaning and separating apparatus which includes a threshing cylinder in crop-receiving relationship to said crop-harvesting apparatus, a concave or concave grate below said threshing cylinder a conveyor apparatus in crop-receiving relationship to said cylinder to move said crop toward the rear of said machine to a cleaning shoe mechanism, a straw walker separating mechanism in crop-receiving relation to said cylinder to receive threshed crops not passing to said conveyor apparatus, said straw walker including a foraminous rack for threshed material to either sift through into an enclosed trough or onto said conveyor apparatus for movement to said cleaning shoe mechanism, and a cleaning fan disposed below the conveyor and forwardly of the cleaning shoe mechanism to deliver a forced flow of air rearwardly up through the cleaning shoe mechanism to blow the chaff out of the rear of the combine, the improvement in said machine comprising:

an airflow conduit operatively mounted at one end relative to said cleaning fan to intercept an airflow therefrom and at its other end oriented to direct said airflow so that at least a portion thereof passes intermediate said cylinder and conveyor apparatus in a rearward direction upwardly through and over the straw walkers and out of the rear of the machine.

2. A device as defined in claim 1 including:

said cleaning fan having a front and rear side with the airflow therefrom to the cleaning shoe mechanism being from said rear side, and said other end of said airflow conduit being operatively associated with the front side of said blower fan.

3. A device as defined in claim 2 including:

the airflow from the rear side of said cleaning fan being undershot, and the airflow from the front side of said cleaning fan being overshot.

4. A device as defined in claim 1 including:

said conveyor apparatus being an endless conveyor means with an upper crop moving level moving from front to rear over an upper pan and a lower return level moving from rear to front over a lower pan, said lower pan being provided with an opening intermediate its front and rear ends, and said other end of said airflow conduit being secured to said lower pan in registration with said opening whereby air discharged from said conduit will be deflected by said upper pan so as to flow in part forwardly between said pans, around the forward end of the conveyor apparatus and then rearwardly between said cylinder and conveyor apparatus and upwardly through and over the straw walkers out of the rear of said machine.

5. A device as defined in claim 4 including:
said air discharged from said conduit flowing in part rearwardly between said pans to the rear end of said conveyor apparatus and then upwardly through said straw walkers out of the rear of said machine.

6. A device as defined in claim 1 including:
said conveyor apparatus being an endless conveyor means with an upper crop moving level moving from front to rear over an upper pan and a lower return level moving from rear to front over a lower pan,
said lower pan being provided with an opening intermediate its front and rear ends, and
said other end of said airflow conduit being secured to said lower pan in registration with said opening whereby air discharged from said conduit will be deflected by said upper pan so as to flow in part rearwardly between said pans to the rear end of said conveyor apparatus and then upwardly through said straw walkers out of the rear of said machine.

7. A device as defined in claim 1 including:
a vertically disposed airflow barrier member secured to and within said housing intermediate said straw walkers and the rearward end of said cleaning shoe mechanism whereby a part of said airflow will be deflected by said barrier member to move upwardly through said straw walkers and out of the rear of the machine to supplement the cleaning effect of the airflow from said conduit.

8. A device as defined in claim 7 including means for vertically adjusting the plane of the lower edge of said barrier member relative to said cleaning shoe mechanism.

9. A device as defined in claim 7 including:
the upper edge of said barrier member being just below the lowermost plane of movement of said straw walkers, and
the lower edge of said barrier member being spaced upwardly from said cleaning shoe mechanism whereby a substantial portion of chaff caught in the airflow from said cleaning fan up through the cleaning shoe mechanism will be floated below said barrier member out of the rear of the machine.

10. In a combine harvesting machine of a type having a forwardly disposed crop-harvesting apparatus, a housing enclosing cleaning and separating apparatus which includes a threshing cylinder in crop-receiving relationship to said crop-harvesting apparatus, a concave or concave grate below said threshing cylinder a conveyor apparatus in crop receiving relationship to said cylinder to move said crop toward the rear of said machine to a cleaning shoe mechanism, a straw walker separating mechanism in crop-receiving relation to said cylinder to receive threshed crops not passing to said conveyor apparatus, said straw walker including a foraminous rack for threshed material to either sift through into an enclosed trough or onto said conveyor apparatus for movement to said cleaning shoe mechanism, and a cleaning fan disposed below the conveyor and forwardly of the cleaning shoe mechanism to deliver a forced flow of air rearwardly up through the cleaning shoe mechanism to blow the chaff out of the rear of the combine, the improvement in said machine comprising:
an airflow conduit operatively mounted at one end to said cleaning fan and extending outwardly therefrom from below one side of said housing and then upwardly with said other end of said airflow conduit secured through said housing so that airflow therefrom is directed between said cylinder and conveyor apparatus and will move rearwardly therefrom upwardly through and over said straw walkers and out of the rear of the machine.

11. A device as defined in claim 10 including:
a second conduit having one end in airflow communication with said airflow conduit, and
said second conduit extending outwardly from below the opposite side of said housing and then upwardly with said other end of said second conduit secured through said other side of said housing so that air flows from said respective conduits will impact between said cylinder and conveyor apparatus and then move rearwardly through and over said straw walkers out of the rear of said machine.

12. In a combine harvesting machine of a type having a forwardly disposed crop-harvesting apparatus, a housing enclosing cleaning and separating apparatus which includes a threshing cylinder in crop-receiving relationship to said crop-harvesting apparatus, a concave or concave grate below said threshing cylinder a conveyor apparatus in crop-receiving relationship to said cylinder to mover said crop toward the rear of said machine to a cleaning shoe mechanism, a straw walker separating mechanism in crop-receiving relation to said cylinder to receive threshed crops not passing to said conveyor apparatus, said straw walker including a foraminous rack for threshed material to either sift through into an enclosed trough or onto said conveyor apparatus for movement to said cleaning shoe mechanism, and a cleaning fan disposed below the conveyor and forwardly of the cleaning shoe mechanism to deliver a forced flow of air rearwardly up through the cleaning shoe mechanism to blow the chaff out of the rear of the combine, the improvement in said machine comprising:
a vertically disposed airflow barrier member secured to and within said housing intermediate said straw walkers and the rearward end of said cleaning shoe mechanism whereby a part of said airflow will be deflected by said barrier member to move upwardly through said straw walkers and out of the rear of the machine.

13. A device as defined in claim 12 including means for vertically adjusting the plane of the lower edge of said barrier member relative to said cleaning shoe mechanism.

14. A device as defined in claim 12 including:
the upper edge of said barrier member being just below the lowermost plane of movement of said straw walkers, and
the lower edge of said barrier member being spaced upwardly from said cleaning shoe mechanism whereby a substantial portion of chaff caught in the airflow from said cleaning fan up through the cleaning shoe mechanism will be floated below said barrier member out of the rear of the machine.